United States Patent Office 3,073,842
Patented Jan. 15, 1963

3,073,842
1,1-DIPHENYL-1-HYDROCARBONOXY,4-TERTIARY AMINO 2-BUTANONES
Albert Schlesinger, Jackson Heights, and Samuel M. Gordon, Forest Hills, N.Y., assignors to Endo Laboratories Inc., Richmond Hill, N.Y., a corporation of New York
No Drawing. Filed July 22, 1957, Ser. No. 673,112
6 Claims. (Cl. 260—326.5)

The present invention is directed to a new class of ketone-ethers; and more particularly to tertiary-amino-diphenyl-ketone-ethers; the salts thereof; and method of preparing same.

This new class of amino-diphenyl-keto-ethers may be represented by the following structural formula:

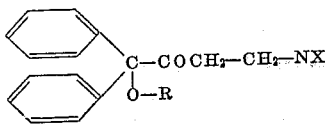

[Formula I]

where R is chosen from the group consisting of lower alkyl radicals having at least 2 carbon atoms, allyl, propargyl, benzyl or phenyl-ethyl radicals, and the unit NX is chosen from the class consisting of di-lower alkylamino, piperidyl, morpholinyl, pyrrolidyl and N-methyl piperazyl.

The compounds of this invention unexpectedly show analgesic properties.

These new compounds of Formula I can be obtained by reacting the Mannich bases, described in our U.S. patent application Serial No. 519,642, filed July 1, 1955, now Patent Number 2,997,479, of the structural formula:

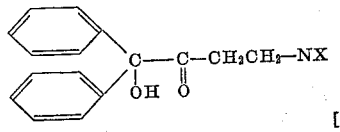

[Formula II]

wherein the unit NX is chosen from the class consisting of di-lower alkylamino, piperidyl, morpholinyl, pyrrolidyl and N-methylpiperazyl with metallic sodium or potassium or their amides or hydrides in an inert solvent like benzol, toluol or xylene till the metal-alcoholate has formed and reacting then those metal-alcoholates with alkyl-, allyl-, propargyl-, or aralkyl-halides.

However, since this procedure leads easily to the formation of side products and low yields, we prefer to obtain the new products of our invention by reacting the ether-ketones having the general formula:

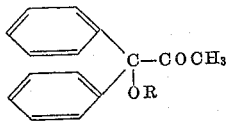

[Formula III]

and wherein R is chosen from the group consisting of lower alkyl, allyl, propargyl, benzyl or phenylethyl with paraformaldehyde and a secondary amine hydrochloride, according to the Mannich reaction.

The ether-ketones of Formula III are described in our co-pending application, Serial No. 673,113, filed concurrently herewith.

The invention is illustrated by the following examples:

Example 1

7 grams of piperidine hydrochloride, 19 grams of 1,1-diphenyl-1-ethoxy-2-propanone and 3 grams of paraformaldehyde are heated on a steam bath for 5 hours under reflux. The reaction mixture is poured into 300 cc. of water. The water solution is made alkaline with sodium hydroxide solution (40 percent in water) and extracted with ether. The ether solution is evaporated under reduced pressure and the residue, an oil, dissolved in ethanol. To the ethanol solution HCl in ethanol is added until the solution shows acidity to Congo red; and by adding ether, the hydrochloride salt of 1,1-diphenyl-1-ethoxy-4-piperidino-2-butanone precipitates. It is recrystallized from acetone. M.P. 160° C.

$C_{23}H_{29}O_2N \cdot HCl$. Calc.: Cl=9.14 percent. Found: Cl=9.20 percent.

Example 2

20 grams of pyrrolidine hydrochloride, 40 grams of 1,1-diphenyl-1-ethoxy-2-propanone and 8 grams of paraformaldehyde in 200 cc. of isopropanol are refluxed for 24 hours. The isopropanol is then distilled off under reduced pressure. The residue is dissolved in 200 cc. of boiling acetone, filtered while hot, and cooled in an ice-bath. The 1,1-diphenyl-1-ethoxy-4-pyrrolidino-2-butanone soon crystallizes in the form of its hydrochloride salt. M.P. 150° C.

$C_{22}H_{27}O_2N \cdot HCl$. Calc.: Cl=9.02 percent. Found: Cl=9.2 percent.

Example 3

5 grams of morpholine hydrochloride, 10 grams of 1,1-diphenyl-1-ethoxy-2-propanone and 3 grams of paraformaldehyde in 100 cc. of dioxane are refluxed for 12 hours. The dioxane is then distilled off, the residue extracted with water, the water solution made alkaline with aqueous sodium hydroxide solution, and the precipitated Mannich base extracted with ether. After evaporation of the ether, the residual base is dissolved in acetone and by adding HCl in ethanol, the hydrochloride salt of 1,1-diphenyl-1-ethoxy-4-morpholino-2-butanone precipitates in crystalline form. M.P. 114° C.

$C_{22}H_{27}O_3N \cdot HCl$. Calc.: Cl=9.09 percent. Found: Cl=9.20 percent.

Example 4

4 grams of dimethylamine hydrochloride, 10 grams of 1,1-diphenyl-1-ethoxy-2-propanone and 3 grams of paraformaldehyde are refluxed in 100 cc. of dioxane for 12 hours. The isolation of the 1,1-diphenyl-1-ethoxy-4-dimethylamino-2-butanone-hydrochloride was similar to the product of Example 3. M.P. 155° C. from acetone.

$C_{20}H_{25}NO_2 \cdot HCl$. Calc.: Cl=10.22 percent. Found: Cl=10.6 percent.

Example 5

5 grams of pyrrolidine hydrochloride, 18 grams of 1,1-diphenyl-1-propoxy-2-propanone and 4 grams of paraformaldehyde in 50 cc. ethanol are refluxed for 24 hours. The ethanol is evaporated, and the residue extracted with 200 cc. of water. The water solution is made alkaline with aqueous sodium hydroxide solution, and the base is extracted with ether. The ether is evaporated and the base dissolved in acetone. HCl in ethanol is then added until the mass shows acidity against Congo red, and by adding ether, the hydrochloride salt of 1,1-diphenyl-1-propoxy-4-pyrrolidino-2-butanone precipitates. M.P. 135° C. from acetone.

$C_{23}H_{19}NO_2 \cdot HCl$. Calc.: Cl=9.14 percent. Found: Cl=9.52 percent.

Example 6

2 grams of dimethylamine hydrochloride, 5.3 grams of 1,1-diphenyl-1-allyloxy-2-propanone and 1.5 grams of paraformaldehyde in 30 cc. of isopropanol are refluxed for 24 hours. The hydrochloride salt of the 1,1-diphenyl-1-allyloxy-4-dimethylamino-2-butanone was isolated by the method similar to that used in isolating the compound of Example 5. M.P. 137° C. from acetone and ether.

$C_{22}H_{25}NO_2 \cdot HCl$. Calc.: Cl=9.88 percent. Found: Cl=10.20 percent.

In accordance with the foregoing procedures we have produced the compounds of the invention which are illustrated by such compounds as:

1,1-diphenyl-1-propoxy-4-dimethylamino-2-butanone hydrochloride, M.P. 149° C.
1,1-diphenyl-1-allyloxy-4-pyrrolidino-2-butanone hydrochloride, M.P. 145° C.
1,1-diphenyl-1-n-butoxy-4-piperidino-2-butanone hydrochloride, M.P. 165° C.
1,1-diphenyl-1-propargyloxy-4-pyrrolidino-2-butanone hydrochloride, M.P. 164° C.
1,1-diphenyl-1-allyloxy-4-morpholino-2-butanone hydrochloride, M.P. 154.8° C.
1,1-diphenyl-1-propargyloxy-4-morpholino-2-butanone hydrochloride, M.P. 168° C.
1,1-diphenyl-1-methoxy-4-pyrrolidino-2-butanone hydrochloride, M.P. 131° C.
1,1-diphenyl-1-methoxy-4-dimethylamino-2-butanone hydrochloride, M.P. 149° C.
1,1-diphenyl-1-benzyloxy-4-pyrrolidino-2-butanone hydrochloride, M.P. 96° C.
1,1-diphenyl-1-benzyloxy-4-dimethylamino-2-butanone hydrochloride, M.P. 148° C.

It will be understood that the foregoing description of the invention and the examples set forth are merely illustrative of the principles thereof. Accordingly, the appended claims are to be construed as defining the invention within the full spirit and scope thereof.

We claim:
1. Members of the group consisting of the bases and the salts thereof whereof the free bases have the formula:

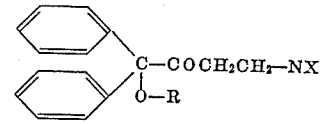

in which R is a member of the group consisting of lower alkyl having from one to four carbon atoms, allyl, propargyl, benzyl and phenyl ethyl and the unit NX is a member of the group consisting of di-lower alkylamino, piperidyl, morpholinyl and pyrrolidyl.

2. 1,1-diphenyl-1-ethoxy-4-pyrrolidino-2-butanone.
3. 1,1-diphenyl-1-ethoxy-4-dimethylamino-2-butanone.
4. 1,1 - diphenyl - 1-ethoxy-4-pyrrolidino-2-butanone hydrochloride.
5. 1,1 - diphenyl - 1-ethoxy-4-dimethylamino-2-butanone hydrochloride.
6. 1,1 - diphenyl - 1-propoxy-4-pyrrolidino-2-butanone hydrochloride.

References Cited in the file of this patent

UNITED STATES PATENTS 2,835,676  Sprague et al. _____ May 20, 1958

OTHER REFERENCES

Adams et al.: "Organic Reactions," pp. 304–308, John Wiley and Sons Inc., 1942.